US011303307B2

(12) United States Patent
Törmänen et al.

(10) Patent No.: US 11,303,307 B2
(45) Date of Patent: Apr. 12, 2022

(54) TRANSCEIVER ELEMENT FOR BEAMFORMING

(71) Applicant: Beammwave AB, Lund (SE)

(72) Inventors: Markus Törmänen, Södra Sandby (SE); Bengt Lindoff, Bjärred (SE)

(73) Assignee: Beammwave AB, Lund (SE)

( * ) Notice: Subject to any disclaimer, the term of this patent is extended or adjusted under 35 U.S.C. 154(b) by 0 days.

(21) Appl. No.: 17/269,519

(22) PCT Filed: Aug. 12, 2019

(86) PCT No.: PCT/EP2019/071568
§ 371 (c)(1),
(2) Date: Feb. 18, 2021

(87) PCT Pub. No.: WO2020/052880
PCT Pub. Date: Mar. 19, 2020

(65) Prior Publication Data
US 2021/0314008 A1 Oct. 7, 2021

(30) Foreign Application Priority Data
Sep. 10, 2018 (EP) .................................... 18193368

(51) Int. Cl.
H04B 7/06 (2006.01)
H04B 1/00 (2006.01)
H04B 7/08 (2006.01)

(52) U.S. Cl.
CPC ......... *H04B 1/0053* (2013.01); *H04B 7/0617* (2013.01); *H04B 7/0897* (2013.01)

(58) Field of Classification Search
CPC .. H04B 1/0053; H04B 7/0617; H04B 7/0897; H04B 7/0697
See application file for complete search history.

(56) References Cited

U.S. PATENT DOCUMENTS

2002/0154687 A1* 10/2002 Bierly ...................... H01Q 3/26
375/222
2011/0122972 A1* 5/2011 Lie ............................ H04B 1/28
375/316
(Continued)

FOREIGN PATENT DOCUMENTS

CN 106918804 A 7/2017
CN 107852211 A 3/2018
(Continued)

OTHER PUBLICATIONS

Extended European Search Report from corresponding European Application No. 18183368.0, dated Mar. 20, 2019, 10 pages.
(Continued)

*Primary Examiner* — Kenneth T Lam
(74) *Attorney, Agent, or Firm* — Tucker Ellis LLP

(57) ABSTRACT

This disclosure relates to a transceiver element comprising receiving circuitry, down-converting circuitry, extracting circuitry and output circuitry. The receiving circuitry is configured to receive a radio frequency signal via an antenna element associated with the receiving circuitry. The radio frequency signal comprises a first received signal part and a second received signal part. The down-converting circuitry is configured to down-convert the radio frequency signal to provide a down-converted signal. The down-converted signal comprises a first down-converted signal part corresponding to the first received signal part and a second down-converted signal part corresponding to the second received signal part. The extracting circuitry is configured to extract at least the second down-converted signal part from the down-converted signal. The output circuitry is configured to provide an output signal comprising a first output signal part and a second output signal part. The first output signal part comprises at least a first intermediate signal part which comprises at least the first down-converted signal part. The (Continued)

second output signal part comprises at least the second down-converted signal part extracted from the down-converted signal. Corresponding transceiver, wireless communication apparatus, method and computer program product are also disclosed.

14 Claims, 7 Drawing Sheets

(56) References Cited

U.S. PATENT DOCUMENTS

2017/0272146 A1* 9/2017 Matsuo .................. H04W 76/14
2021/0167996 A1* 6/2021 Ratnam ............... H04L 27/2649

FOREIGN PATENT DOCUMENTS

| WO | 2010132801 A1 | 11/2010 |
|----|---------------|---------|
| WO | 2017037861 A1 | 3/2017  |
| WO | 2017044038 A1 | 3/2017  |

OTHER PUBLICATIONS

International Search Report and Written Opinion from corresponding International Application No. PCT/EP2019/071568, dated Sep. 30, 2019, 16 pages.

* cited by examiner

US 11,303,307 B2

TRANSCEIVER ELEMENT FOR BEAMFORMING

TECHNICAL FIELD

The present disclosure relates generally to the field of reception of wireless communication signals. More particularly, it relates to a transceiver element for reception of wireless communication signals.

BACKGROUND

Wireless communication is expanding to new radio spectrum parts in order to meet the requirements for higher data rates. For example, the newly defined fifth generation (5G) new radio (NR) standard not only introduces new services (e.g., low latency high reliability services), but also supports increased capacity and higher data rates.

To facilitate capacity increase, NR introduces wireless communication on millimeter wavelength (mmW) radio frequencies (e.g., frequency bands above 10 GHz, such as the 28 GHz frequency band or the 39 GHz frequency band). Due to that mmW radio frequencies typically entails higher path loss than lower frequency signaling, cells of a mmW cellular wireless communication system will typically cover smaller areas than those of a lower frequency communication system. Therefore, communication devices supporting 5G NR in the mmW frequency range will typically support also wireless communication using lower frequencies (e.g., below 6 GHz) for coverage.

One advantage with mmW transmission is that the short wavelength enables use of small antennas, which in turn makes it possible to have massive-MIMO transceiver arrangements comprised in small (e.g., handheld) wireless communication devices. For example, it may be possible to fit antenna panels with, e.g., 4×2 antennas in a module having a size in of approximately 25×16 mm. This advantage enables application of beamforming for mmW, which may significantly increase the cellular capacity and/or coverage.

Analog beamforming may be implemented using an antenna array with phase shifters, and the beam direction of the combined radio signal of the antenna array can by controlled by tuning the phase shifters. Different, or the same, directions may be applied for transmission and reception. For analog beamforming, the combined radio signal can be up- or down-converted in a single radio frequency (RF) chip. A disadvantage with analog beamforming is that the antenna array can only apply a single (transmit and/or receive) beam at the same time. This leads to that simultaneous multi-user scenarios are not possible. Furthermore, abrupt changes of channel conditions (e.g., due to blocking of antennas, rotation of the transceiver, etc.) are hard to track with a single beam limitation. Thus, there is a high risk of signal outage in connection to abrupt changes of channel conditions.

Digital beamforming may provide increased flexibility compared to analog beamforming. In digital beamforming implementations, the signal of each antenna of an antenna array is typically up- or down-converted in a separate RF chip (i.e., there are multiple RF chips—one per antenna of the array) and the beamforming control is performed in the digital baseband signal (e.g., by digital phase shifting). Thereby, several beams can be tracked simultaneously and it may be possible to follow fast changes of channel conditions, thereby improving receiver and/or transmitter performance.

FIG. 1A schematically illustrates an example transceiver arrangement 110 for handheld devices. The arrangement is a multi-mode arrangement supporting wireless communication, such as communication according to the 5G NR standard, in the mmW frequency range as well as wireless communication, such as communication according to the fourth generation (4G) standard or the 5G NR standard, using lower frequencies (e.g., below 6 GHz). The communication in the mmW frequency range uses analog beamforming in this example.

The arrangement comprises two mmW systems 120, 130, wherein each of the mmW systems is adapted for reception in a respective frequency band. For example, the mmW system 120 may be adapted for reception in a first frequency band (e.g., a 28 GHz band) and the mmW system 130 may be adapted for reception in a second frequency band (e.g., a 39 GHz band) band. Each mmW system has an antenna array 122, respective radio frequency front ends (RF FE) 124 for each of the antennas of the array and a mmW chip 126. The arrangement also comprises antennas and radio frequency front ends 146 for wireless communication using lower frequencies.

Since the arrangement is a multi-mode arrangement, one convenient approach is to up- or down-convert the mmW signals 127, 137 from or to intermediate frequency (IF; lower frequency RF) signals 128, 138 (e.g., below 6 GHz) and process the IF signals in an RF chip 140 which is configured to process signals at lower than mmW frequencies. The conversion between mmW and IF may be performed by additional RF FEs 129, 139. Such an approach also enables carrier aggregation of mmW and lower frequency carriers (e.g., sub 6 GHz), since common processing in the RF chip 140 enables simultaneous transmission and/or reception of mmW and lower frequency carriers.

The RF chip 140 also performs up- or down-conversion between the lower frequency RF signals and baseband signals 141, 142. Further processing of the baseband signals (e.g., channel estimation, (de-)modulation, (de-)coding, etc.) is performed in a baseband processing chip (BB) 145. The interface between the RF chip 140 and the BB chip 145 may be digital or analog, and the signals associated with mmW 141 may have an interface separate from that of the signals associated with lower frequencies 142.

As mentioned above, digital beamforming have some advantages over analog beamforming. However, a problem with using digital beamforming is that the signal interfaces relating to mmW (e.g., the interface 141 between the RF chip 140 and the baseband chip 145) require multiple inputs/outputs (one for each antenna) to achieve full digital beamforming advantages.

This potentially entails a huge amount of data to be transferred over such interfaces. Transfer may be implemented as parallel transfer (requiring a large amount of hardware for the interface) and/or as serial transfer (requiring a high operational speed of the interface). Typically, redesign of the baseband chip (for support of multiple input/outputs) and/or the RF-BB interface is required, which may cause additional costs and/or deployment delays.

Therefore, there is a need for alternative wireless transceiver solutions for beamforming implementations. Preferably, such alternative wireless transceiver solutions should be suitable for beamforming application in the mmW frequency range.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

It should be noted that the above scenario and problem description is merely intended as illustrative, and that embodiments may be equally applicable in other scenarios and/or solving other problems. For example, application of embodiments is not limited to mmW transceivers, nor to small or handheld devices, but may be equally applicable for other frequency ranges and or for large and/or stationary wireless communication apparatuses.

A first aspect is a transceiver element comprising receiving circuitry, down-converting circuitry, extracting circuitry, and output circuitry.

The receiving circuitry is configured to receive a radio frequency signal via an antenna element associated with the receiving circuitry, wherein the radio frequency signal comprises a first received signal part and a second received signal part.

The down-converting circuitry is configured to down-convert the radio frequency signal to provide a down-converted signal, wherein the down-converted signal comprises a first down-converted signal part corresponding to the first received signal part and a second down-converted signal part corresponding to the second received signal part.

The extracting circuitry is configured to extract at least the second down-converted signal part from the down-converted signal.

The output circuitry is configured to provide an output signal comprising a first output signal part and a second output signal part, wherein the first output signal part comprises at least a first intermediate signal part which comprises at least the first down-converted signal part, and wherein the second output signal part comprises at least the second down-converted signal part extracted from the down-converted signal.

In some embodiments, the extracting circuitry is further configured to extract the first down-converted signal part from the down-converted signal to provide the first intermediate signal part.

In some embodiments, the extracting circuitry is configured to extract only the second down-converted signal part from the down-converted signal. Then, the first intermediate signal part is the down-converted signal.

In some embodiments, the output circuitry comprises first and second output ports, wherein the first output port is configured to output a first output signal comprising the first output signal part and the second output port is configured to output a second output signal comprising the second output signal part.

In some embodiments, the output circuitry comprises one input port configured to output a single output signal comprising the first and second output signal parts. Then, the transceiver element further comprises multiplexing circuitry configured to multiplex the first output signal part and the second output signal part to provide the single output signal.

In some embodiments, the transceiver element further comprises first multiplying circuitry configured to scale and/or phase shift the first intermediate signal part.

In some embodiments, the first received signal part comprises data and/or control symbols, and the second received signal part comprises reference symbols for beamforming control.

In some embodiments, the transceiver element further comprises input circuitry, combining circuitry and concatenating circuitry. The input circuitry is configured to receive an input signal from a further transceiver element, wherein the input signal comprises a first input signal part and a second input signal part. The combining circuitry is configured to combine the first input signal part and the first intermediate signal part to provide the first output signal part. The concatenating circuitry is configured to concatenate the second input signal part and the second down-converted signal part to provide the second output signal part.

In some embodiments, the input circuitry comprises first and second input ports, wherein the first input port is configured to receive a first input signal comprising the first input signal part and the second input port is configured to receive a second input signal comprising the second input signal part.

In some embodiments, the input circuitry comprises one input port configured to receive a single input signal comprising the first and second input signal parts. Then, the transceiver element further comprises de-multiplexing circuitry configured to separate the first and second input signal parts of the single input signal.

In some embodiments, the first input signal part comprises data and/or control information, and the second input signal part comprises reference symbols for beamforming control.

In some embodiments, the transceiver element further comprises additional input circuitry configured to receive a transmit signal, up-converting circuitry configured to up-convert the transmit signal to a radio frequency transmit signal, transmitting circuitry configured to transmit the radio frequency transmit signal via an antenna element associated with the transmitting circuitry, and additional output circuitry configured to provide the transmit signal to the further transceiver element. Such a transceiver may further comprise second multiplying circuitry configured to scale and/or phase shift the transmit signal.

A second aspect is a transceiver comprising two or more transceiver elements according to the first aspect and a further signal processing element. The two or more transceiver elements according to the first aspect and the further signal processing element are connected in series wherein the output circuitry of each of the transceiver elements is connected to input circuitry of either of another one of the transceiver elements and the further signal processing element.

A third aspect is a transceiver comprising two or more transceiver elements and a further signal processing element. The two or more transceiver elements and the further signal processing element are connected in series wherein an output circuitry of each of the transceiver elements is connected to an input circuitry of either of another one of the transceiver elements and the further signal processing element.

A fourth aspect is a wireless communication apparatus comprising the transceiver of any of the second or third aspects.

A fifth aspect is a method for a transceiver element. The method comprises receiving a radio frequency signal via an antenna element associated with the receiving circuitry, wherein the radio frequency signal comprises a first received signal part and a second received signal part. The method also comprises down-converting the radio frequency signal to provide a down-converted signal, wherein the down-converted signal comprises a first down-converted signal part corresponding to the first received signal part and a second down-converted signal part corresponding to the second received signal part. The method also comprises extracting at least the second down-converted signal part from the down-converted signal. The method also comprises providing an output signal comprising a first output signal part and a second output signal part, wherein the first output signal part comprises at least a first intermediate signal part which comprises at least the first down-converted signal part, and wherein the second output signal part comprises at least the second down-converted signal part extracted from the down-converted signal.

A sixth aspect is a computer program product comprising a non-transitory computer readable medium, having thereon a computer program comprising program instructions. The computer program is loadable into a data processing unit and configured to cause execution of the method according to the fifth aspect when the computer program is run by the data processing unit.

In some embodiments, any of the above aspects may additionally have features identical with or corresponding to any of the various features as explained above for any of the other aspects.

An advantage of some embodiments is that the signal interfaces relating to mmW no longer require multiple inputs/outputs (one for each antenna) to achieve full digital beamforming advantages.

Another advantage of some embodiments is that the amount of data transferred over such interfaces is reduced; typically substantially.

Yet an advantage of some embodiments is that redesign of the baseband chip and/or the RF-BB interface may be avoided, thereby reducing costs and/or deployment delays. Typically, legacy baseband chips and/or RF-BB interfaces may be used with no or minor modifications.

An advantage of some embodiments is that transceiver elements are provided that are suitable to connect in series with each other to provide a transceiver arrangement for enabling any of the above advantages.

Some embodiments enable reuse of a RF-BB interface for analog beamforming transceiver arrangement in a digital beamforming approach. Thereby, the BB chip design and architecture can be reused, which enables cost efficient migration from devices supporting analog beamforming to devices supporting digital beamforming.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where transceiver elements are provided, suitable to be connected in series with each other for reduction of an amount of signaling needed in an RF-BB interface in digital beamforming applications.

Figure 1A:
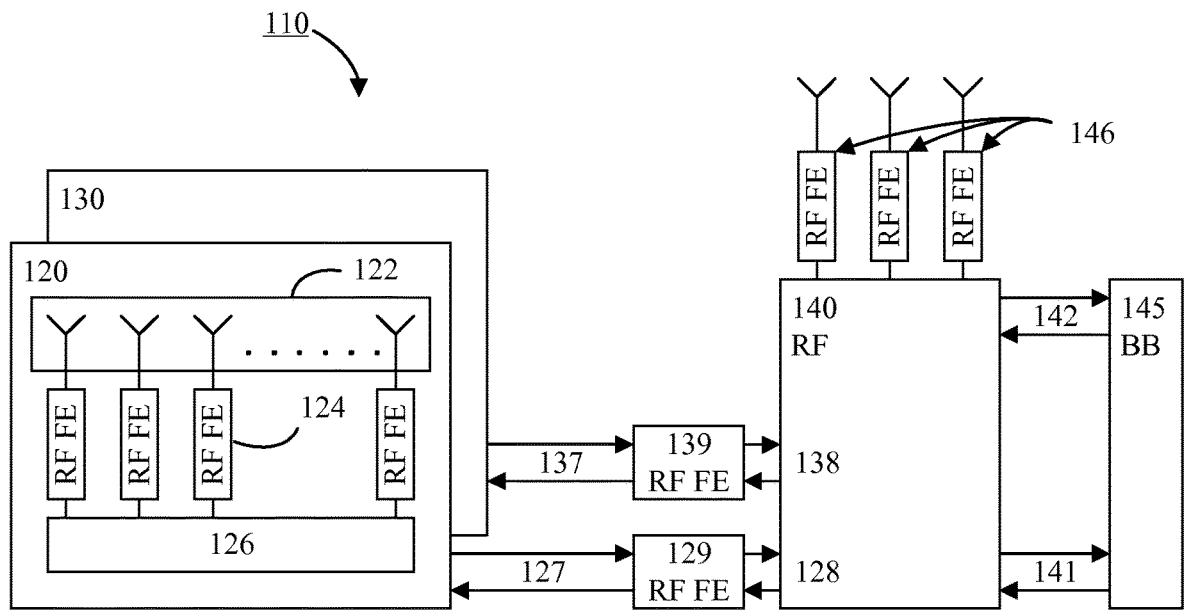
FIG. 1A is a schematic block diagram illustrating an example transceiver arrangement.
Figure 1B:
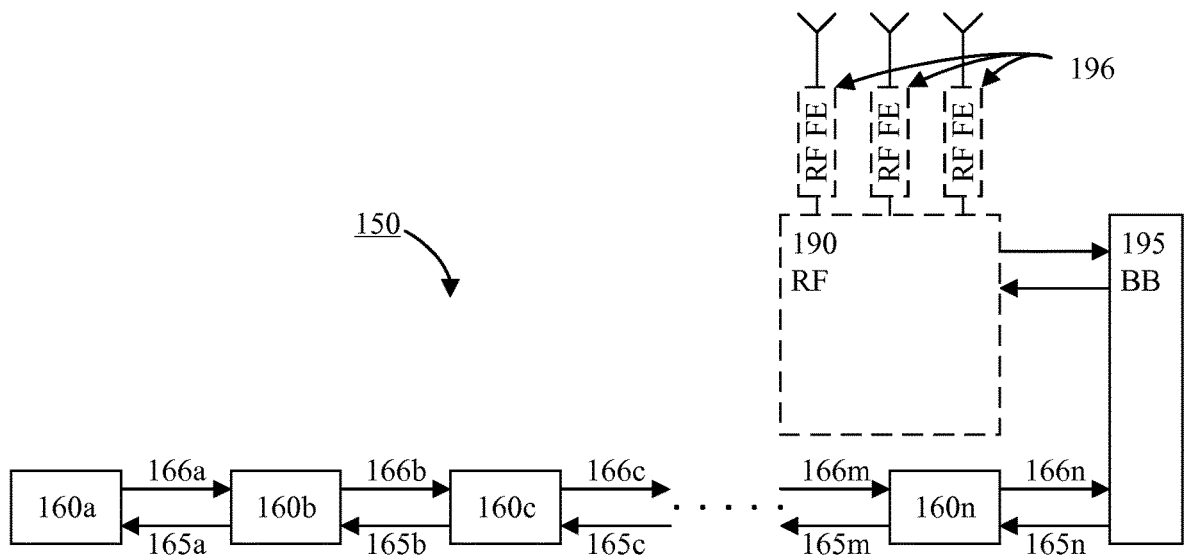
FIG. 1B is a schematic block diagram illustrating an example transceiver arrangement according to some embodiments.

FIG. 1B schematically illustrates an example transceiver arrangement (e.g., a transceiver) 150. The transceiver arrangement may be comprised in a wireless communication apparatus, e.g., a wireless communication device such as a terminal (e.g., a user equipment, UE, a station, STA, a smartphone, an Internet-of-Things device, IoT-device, etc.) or a network node (e.g., a base station, a radio base station, RBS, a NodeB, NB, an enhanced NodeB, eNB, a gNodeB, gNB, an access point, AP, etc.). The transceiver arrangement is suitable for digital beamforming applications, and may, for example also, or alternatively, be employed in multiple-input, multiple-output (MIMO) applications, or massive-MIMO applications.

The transceiver arrangement comprises a plurality (e.g., two or more) of transceiver elements 160a, 160b, 160c, . . . , 160n, and a further signal processing element such as a baseband chip (BB) 195. The plurality of transceiver elements and the further signal processing element are connected in series for transfer of received signals, wherein an output circuitry of each of the transceiver elements is connected to input circuitry of either of another one of the transceiver elements and the further signal processing element, as illustrated by 166a, 166b, 166c, . . . , 166m, 166n in FIG. 1B.

The plurality of transceiver elements and the further signal processing element may typically also be connected in series for transfer of signals to be transmitted, wherein an additional input circuitry of each of the transceiver elements is connected to an additional output circuitry of either of another one of the transceiver elements and the further signal processing element, as illustrated by 165a, 165b, 165c, . . . , 165m, 165n in FIG. 1B.

For example, the transceiver arrangement may be a multi-mode arrangement supporting wireless communication (such as communication according to the 5G NR standard or according to the Wireless Gigabit Alliance, WiGig, standard) in the mmW frequency range via the transceiver elements 160a, 160b, 160c, . . . , 160n as well as wireless communication using lower frequencies (e.g., below 6 GHz).

If the transceiver arrangement is a multi-mode arrangement, it may also comprise antennas, radio frequency front ends 196, and a radio frequency processing chip (RF) 190 for wireless communication using lower frequencies.

This approach also enables simultaneous transmission and/or reception of mmW and lower frequency carriers, and thereby carrier aggregation of mmW and lower frequency carriers.

Comparing with the arrangement of FIG. 1A, it can be seen that there is no need for conversion between mmW frequencies and an intermediate RF frequency for processing the RF chip 190. Instead mmW frequency signals may be directly converted to baseband in the transceiver elements 160a, 160b, 160c, . . . , 160n.

It should be noted, however, that in other embodiments, the transceiver elements 160a, 160b, 160c, . . . , 160n may convert between mmW and IF. Then, the IF signals may be processed in a common RF chip similarly to the approach of FIG. 1A.

Furthermore, as will be further elaborated on later herein, the amount of data over the interface 165n, 166n is reduced without losing any digital beamforming advantages.

Typically, a legacy baseband chip (e.g., 145 of FIG. 1A) can be used directly as the baseband chip 195 of the arrangement 150, requiring no or very minor adjustments of the interface 165n, 166n and/or the corresponding port of the baseband chip.

Example transceiver elements 200, 300 (e.g., transceiver elements 160a, 160b, 160c, . . . , 160n,) will now be described with reference to FIGS. 2A and 3A. The transceiver elements are suitable for digital beamforming applications, and may, for example be employed in multiple-input, multiple-output (MIMO) applications, or massive-MIMO applications.

Figure 2A:
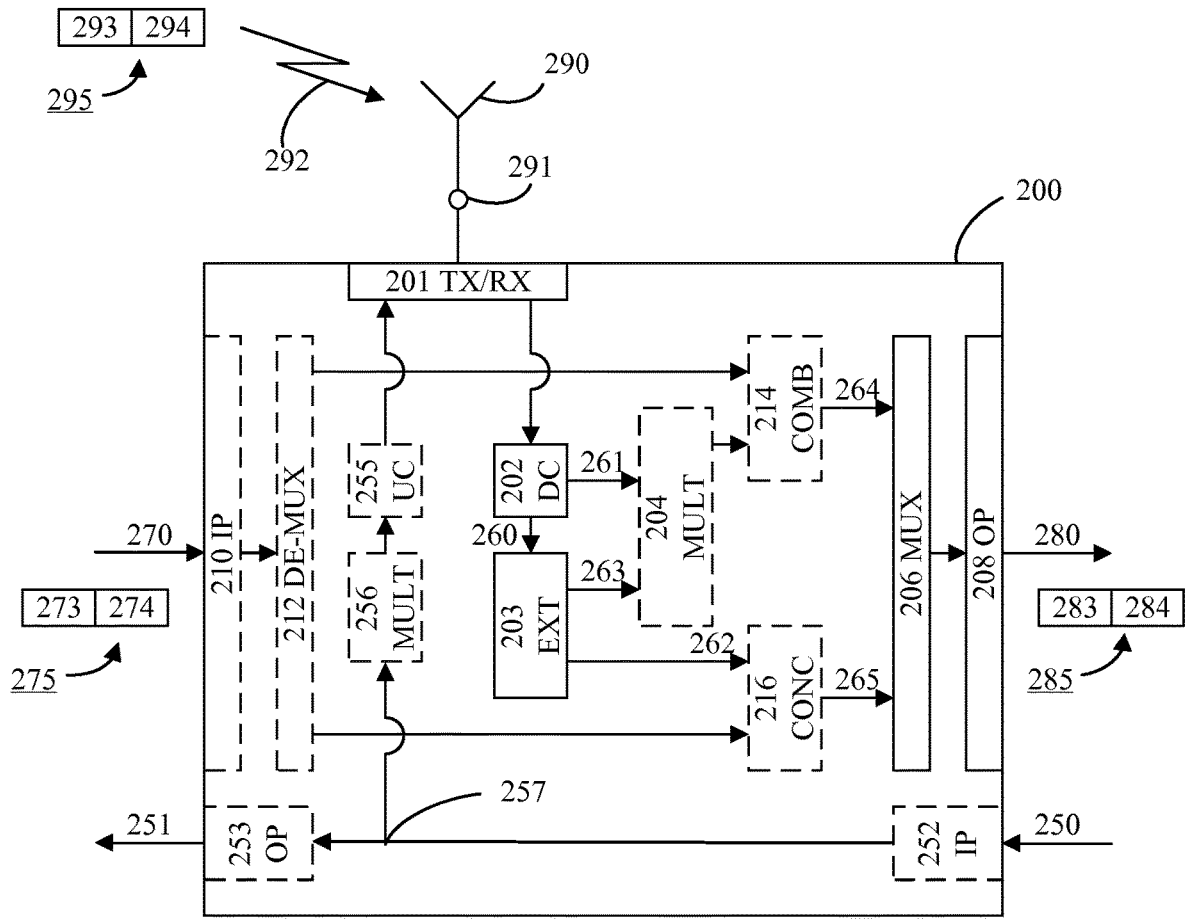
FIG. 2A is a schematic block diagram illustrating an example transceiver element according to some embodiments.
Figure 3A:
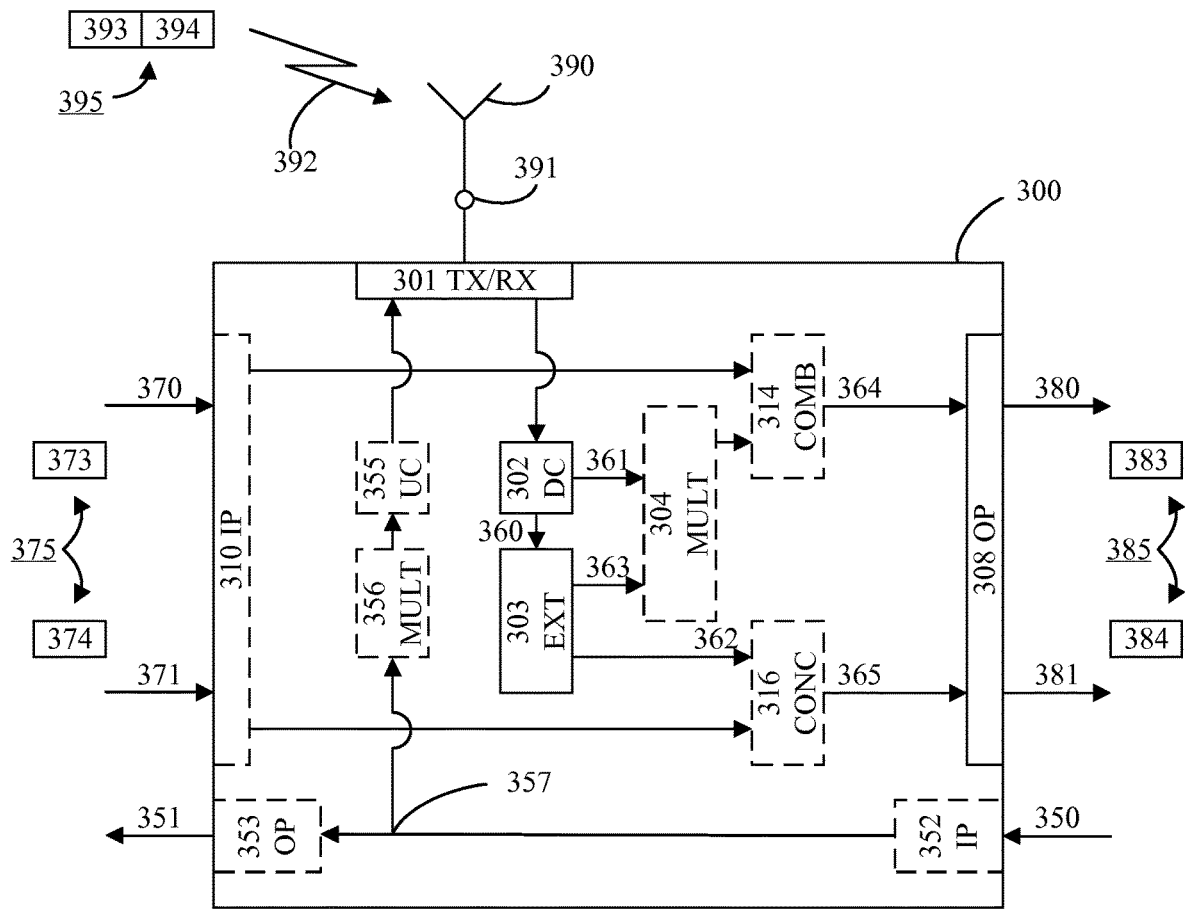
FIG. 3A is a schematic block diagram illustrating an example transceiver element according to some embodiments.

The transceiver element 200, 300 comprises receiving circuitry (RX; e.g., a receiver—illustrated in FIGS. 2A and 3A as part of transceiver circuitry, TX/RX 201, 301). The receiver circuitry is configured to receive a radio frequency (e.g., mmW) signal 292, 295, 392, 395 via an antenna element 290, 390 associated with the receiving circuitry. The antenna element may, for example, comprise a single antenna element or dual antenna element for polarized transmission and/or reception. However, the antenna element may comprise a plurality (e.g., more than two) antenna elements in some embodiments. The antenna element may be comprised in the transceiver element, or the transceiver element may be connectable to the antenna element via an antenna port 291, 391.

The radio frequency signal comprises a first received signal part 293, 393 and a second received signal part 294, 394. The first received signal part comprises data and/or control symbols, and the second received signal part comprises reference symbols for beamforming control.

The term reference symbols for beam forming control may, in this context, be interpreted to mean reference symbols used by a receiver to adjust its receiver beam (and typically, but not necessarily, also its corresponding transmitter beam). Thus, reference symbols for beam forming control may comprise, or be indicative of, spatial receiver parameters that the receiver should use for optimized reception of transmitted signals.

Typically, a transmitting node (e.g. an access node of a network) transmits data and control information in a certain spatial direction using a transmission beam, and transmits reference symbols in the same transmission beam. An intended receiver (e.g., a terminal such as a UE) can use the reference symbols to adjust the receiver beam such that it points in substantially the same direction as the direction from which the transmission beam from the transmitting node is received. Thereby, reception may be optimized (e.g., the received signal strength may be maximized).

Hence, the transmission of reference symbols for beamforming control may be regarded as quasi-co-located (QCL) with the transmission of the control and data information from the transmitting node.

By application of embodiments disclosed herein, only the information of the second received signal part is provided separately (by concatenation) for each transceiver element to the baseband chip, while the information of the first received signal part is combined (e.g., by addition, overlaying, or similar; in analogy with signals transferred in analog beamforming scenario) for all of the transceiver elements and provided in combined for to the baseband chip. Thereby, the amount of data to transfer to the baseband chip is substantially reduced compared to when data from each antenna element is provided separately to the baseband chip. Hence, it may be possible to reuse baseband chips and interfaces for analog beamforming with no or minor adjustment. This is achieved without degrading the beamforming since the reference symbols for beamforming control are provided separately. Furthermore, since the data and/or control symbols of the first received signal part is identical for all transceiver element, no information is lost by combining of these signal parts.

Reference symbols for beamforming control may, for example, comprise symbols that are used for channel estimation and/or beamforming weight selection, and/or symbols indicative of a result of channel estimation performed by another device (e.g., indexing a preferred beam). Examples of reference symbols for beamforming control include, but is not limited to, pilot symbols, channel state information reference symbols (CSI-RS), primary synchronization signals (PSS), secondary synchronization signals (SSS), and secondary synchronization blocks (SSB).

The second received signal part (the reference symbols for beamforming) typically makes up a very small part of the signal content compared to the first received signal part (the data and/or control signals). For example, in NR for mmW configurations the overhead due to pilot symbol signaling for beamforming purposes is, in a typical case, approximately 1%, or less. Therefore, applying combining for some part of the signal and concatenation for other part of the signal (the reference symbols for beamforming control) as explained above, the signal size (measured, as applicable in symbols, time, bandwidth, number of streams, etc.) is only slightly increased compared to the analog beamforming case. For example, if the reference symbols for beamforming control constitutes 1% of the received signal and N antenna elements are used for beamforming, application of embodiments presented herein results in a signal size which is only a factor of 1+0.01N larger than for analog beamforming, while application of prior art techniques for digital beamforming would result in a signal size which is a factor of N larger.

The transceiver element 200, 300 also comprises down-converting circuitry (DC; e.g., a down-converter) 202, 302 configured to down-convert the radio frequency signal to provide a down-converted signal 260, 261, 360, 361. As mentioned in connection with FIG. 1B, down-conversion may be to baseband or to an intermediate frequency (IF), which is typically a radio frequency lower than mmW (e.g., below 6 GHz), for processing in an RF chip before provision to the baseband chip.

Of course, the down-converted signal comprises a first down-converted signal part corresponding to the first received signal part and a second down-converted signal part corresponding to the second received signal part.

The transceiver element 200, 300 also comprises extracting circuitry (EXT; e.g., an extractor, such as a power splitter in the case of analog signals) 203, 303 which receives the down-converted signal 260, 360, and which is configured to extract at least the second down-converted signal part 262, 362 from the down-converted signal. In some embodiments, the extracting circuitry is further configured to extract the first down-converted signal part 263, 363 from the down-converted signal.

The transceiver element 200, 300 also comprises output circuitry (OP; e.g., an output interface, and/or one or more output ports) 208, 308 configured to provide an output signal 280, 285, 380, 381, 385. Referring to FIG. 1B, this output signal is, for example, provided to another transceiver element or to a baseband chip. Thus, the output circuitry may be connectable to another transceiver element, to a baseband chip, and/or to any other suitable entity such as a RF chip.

The output signal 280, 285, 380, 381, 385 comprises a first output signal part 283, 383 and a second output signal part 284, 384.

The first output signal part comprises at least a first intermediate signal part which comprises at least the first down-converted signal part 293', 393'. When the extracting circuitry is configured to extract the first down-converted signal part 263, 363, the intermediate signal is the first down-converted signal part 263, 363, 293', 393'. When the extracting circuitry is configured to extract only the second down-converted signal part 262, 362, the intermediate signal is the down-converted signal 261, 361 comprising both the first and second down-converted signal parts 293', 294', 393', 394'.

In some embodiments, the transceiver element 200, 300 also comprises comprising first multiplying circuitry (MULT; e.g., a multiplier, scaler, phase shifter, or similar) 204, 304 configured to scale and/or phase shift the first intermediate signal part 261, 263, 361, 363 before it is output via the output circuitry. Typically, scaling and/or phase shifting may be implemented by multiplication by the complex value $Ae^{j\varphi_l}$, where A is a scaling factor and $\varphi_l$ is a phase shift, one or more of which may be associated with the RX beamforming weights of the particular transceiver element (e.g., provided by a baseband processing unit performing the beamforming control).

The second output signal part comprises at least the second down-converted signal part (262, 294', 362, 394', 411, 421, 431, 441) extracted from the down-converted signal. The second output signal part does not comprise the first down-converted signal part.

In some embodiments the transceiver element also comprises input circuitry (IP; e.g., an input interface, and/or one or more input ports) 210, 310 configured to receive an input signal 270, 275, 370, 371, 375 from a further transceiver element. As illustrated in FIG. 1B, the input signal of one transceiver element may typically be the output signal of a further transceiver element (except for a first transceiver element 160a in a chain of transceiver elements; whose input circuitry may be arranged such that no input signal is received; e.g., connected to a reference potential). Thus, the input circuitry may be connectable to a further transceiver element.

The input signal comprises a first input signal part 273, 373 and a second input signal part 274, 374. Typically, the first input signal part 273, 373 corresponds to the first output signal part 283, 383 of the other transceiver element, and the second input signal part 274, 374 corresponds to the second output signal part 284, 384 of the other transceiver element. Thus, the second input signal part typically comprises reference symbols for beamforming control, and the first input signal part typically comprises data and/or control information, and also—when there is no extraction of the second down-converted signal part—reference symbols for beamforming control.

The transceiver element may also comprise combining circuitry (COMB; e.g., a combiner such as an adder) 214, 314 configured to combine the first input signal part 273, 373 and the first intermediate signal part (after scaling and/or phase shifting, as applicable) to provide the first output signal part 264, 364.

The transceiver element may also comprise concatenating circuitry (CONC; e.g., a concatenator) 216, 316 configured to concatenate the second input signal part 274, 374 and the second down-converted signal part to provide the second output signal part 265, 365.

The first and second in/output signal parts may be transferred between transceiver elements in series (FIG. 2A) or in parallel (FIG. 3A). The parallel approach has the advantage that the clocking frequency of the interfaces may be kept at a lower speed than for the serial approach, and that (de-) multiplexers are not needed in the transceiver elements. The serial approach has the advantage that the interface hardware may be simplified.

In the serial approach, the output circuitry comprises one input port configured to output a single output signal 280 comprising the first and second output signal parts 283, 284 and the input circuitry comprises one input port configured to receive a single input signal 270 comprising the first and second input signal parts 273, 274. The transceiver element comprises multiplexing circuitry (MUX; e.g., a multiplexor) 206 configured to multiplex the first output signal part 264, 283 and the second output signal part 265, 284 to provide the single output signal. The transceiver element also comprises de-multiplexing circuitry (DE-MUX; e.g., a de-multiplexor) 212 configured to separate the first 273 and second 274 input signal parts of the single input signal. In some embodiments, the serial approach may implement a Serializer/Deserializer (SerDes) interface and components therefore may be comprised in the in/output circuitry.

In the parallel approach, the output circuitry comprises first and second output ports and the input circuitry comprises first and second input ports. The first output port is configured to output a first output signal 380 comprising the first output signal part 383 and the second output port is configured to output a second output signal 381 comprising the second output signal part 384. The first input port is configured to receive a first input signal 370 comprising the first input signal part 373 and the second input port is configured to receive a second input signal 371 comprising the second input signal part 374.

To enable the transceiver elements for efficient beamforming transmission, each transceiver element 200, 300 may also comprise additional input circuitry (IP) 252, 352 configured to receive a transmit signal 250, 350; typically from another transceiver element or from a baseband chip. The transceiver element may also comprise up-converting circuitry (UC; e.g. an up-converter) 255, 355 configured to up-convert the transmit signal to a radio frequency (e.g., mmW) transmit signal, and transmitting circuitry (TX; e.g., a transmitter—illustrated in FIGS. 2A and 3A as part of transceiver circuitry, TX/RX 201, 301) configured to transmit the radio frequency transmit signal via an antenna element 290, 390 associated with the transmitting circuitry as explained above.

The transceiver element 200, 300 may also comprise additional output circuitry (OP) 253, 353 configured to provide the transmit signal 251, 351 to a further transceiver element.

In some embodiments, the transceiver element may also comprise second multiplying circuitry (MULT; e.g., a multiplier, scaler, phase shifter, or similar) 256, 356 configured to scale and/or phase shift the transmit signal. Typically, scaling and/or phase shifting may be implemented by multiplication by the complex value $Be^{j\theta_l}$, where B is a scaling factor and $\theta_l$ is a phase shift, one or more of which may be associated with the TX beamforming weights of the particular transceiver element.

The multiplying circuitry may be arranged just before the up-converting circuitry as illustrated in FIGS. 2A and 3A (thereby multiplying only the signal that is to be up-converted) or may be arranged just after the additional input circuitry 252, 352 and before the splitter 257, 357 (thereby multiplying both the signal that is to be up-converted and the signal that is provided to the further transceiver element via the additional output circuitry).

The multiplying circuitries 204, 256 and 304, 356, respectively, may utilize the same or different hardware in various embodiments.

Generally, a conversion between the digital and analog domains may take place anywhere in the IF or BB processing as suitable. For example, conversion between digital and analog domains may be implemented in connection with the up-/down-conversion such that most of the processing in the transceiver elements as well as the input/output signals are in the digital domain. Alternatively, conversion between digital and analog domains may be implemented in the baseband chip such that all of the processing in the transceiver elements as well as the input/output signals are in the analog domain. Yet alternatively, conversion between digital and analog domains may be implemented anywhere there between.

Of course, other functional and/or structural elements may also be comprised in the transceiver element even if not explicitly illustrated herein. For example, the transceiver circuitry 201, 301 and/or the up-/down-converters 202, 255, 302, 355 may comprise duplexer(s), antenna switch(es), low noise amplifier(s), power amplifier(s), analog filter(s), mixer(s), carrier wave generator(s), etc. Alternatively or additionally, the transceiver circuitry may further comprise analog-to-digital converter(s)—ADCs, digital-to-analog converter(s)—DACs, buffers, further adder(s), further multiplier(s), further (de-)multiplexer(s), etc.

Figure 2B:
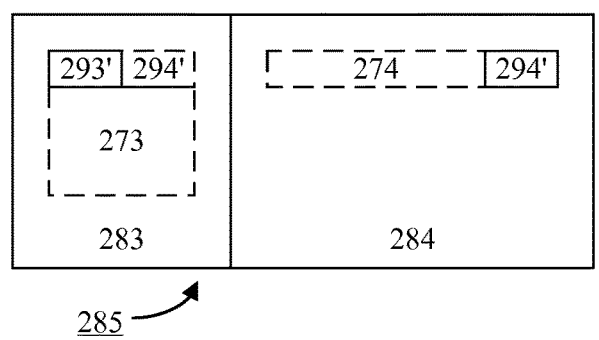
FIG. 2B is a schematic drawing illustrating an example output signal according to some embodiments.
Figure 3B:
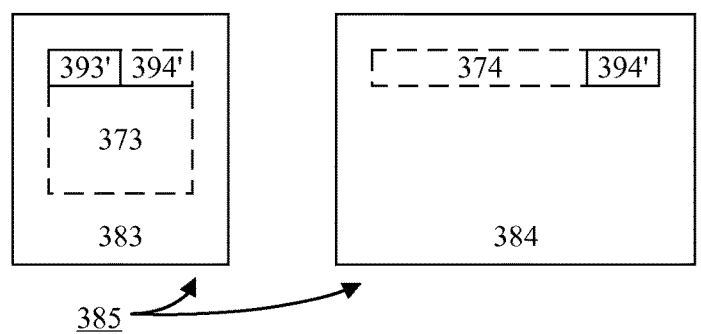
FIG. 3B is a schematic drawing illustrating an example output signal according to some embodiments.

FIGS. 2B and 3B schematically illustrate the output signals 285, 385. The output signal 285 comprises the first and second output signal parts 283, 284 provided in series via one single output port while the output signal 385 comprises the first and second output signal parts 383, 384 provided in parallel via respective ones of two output ports.

The first output signal part 283, 383 comprises at least a first intermediate signal part (possibly scaled and/or phase shifted). The first intermediate signal part comprises at least the first down-converted signal part 293', 393', and possibly also the second down-converted signal part 294', 394' (when the extracting circuitry is configured to extract only the second down-converted signal part). When there is an input signal 275, 375, the first output signal part 283, 383 also comprises the first input signal part 273, 373; combined with the first intermediate signal part.

The second output signal part 284, 384 comprises at least the second down-converted signal part 294', 394' (extracted from the down-converted signal). When there is an input signal 275, 375, the second output signal part 284, 384 also comprises the second input signal part 274, 374; concatenated with the second intermediate signal part. The second output signal part 284, 384 does not comprise any of the first down-converted signal part 293', 393' and the first input signal part 293, 373.

When referred to herein combination of signal parts may, according to some embodiments, be defined as the process of adding signal parts without changing the number of symbols or the signal length. A combined signal may be seen as having a number of symbols that is the same as the number of symbols of each signal part having been combined. Alternatively or additionally, a combined signal may be seen as having a signal length (e.g. a duration in time) that is the same as the signal lengths of each signal part having been combined. Other definitions of combination may be used without departing from the scope of the claims.

When referred to herein concatenation may be defined as the process of stacking signal parts one after another (e.g., in time and/or in frequency).

Each concatenated signal part is unchanged by the concatenation according to some embodiments. A concatenated signal may then be seen as having a number of symbols that corresponds to the sum of the number of symbols for each signal part having been concatenated. Alternatively or additionally, a concatenated signal may then be seen as having a signal length (e.g. a duration in time) that corresponds to the sum of the signal lengths for each signal part having been concatenated.

In some embodiments, some or all concatenated signal parts may be changed (e.g., punctured) in connection with the concatenation. A concatenated signal may then be seen as having a number of symbols that is less than, but typically substantially corresponds to, the sum of the number of symbols for each signal part having been concatenated. Alternatively or additionally, a concatenated signal may then be seen as having a signal length (e.g. a duration in time) that is less than, but typically substantially corresponds to, the sum of the signal lengths for each signal part having been concatenated.

Other definitions of concatenation may be used without departing from the scope of the claims. Generally, any solution where each element (e.g., a symbol or sequence of symbols) of each signal part having been concatenated can either be found as an identical element in the concatenated signal or cannot be found in the concatenated signal, and wherein the concatenated signal contains only elements identical to elements of the signal parts having been concatenated, can be interpreted as falling under the terminology of concatenation as used herein.

Figure 4A:
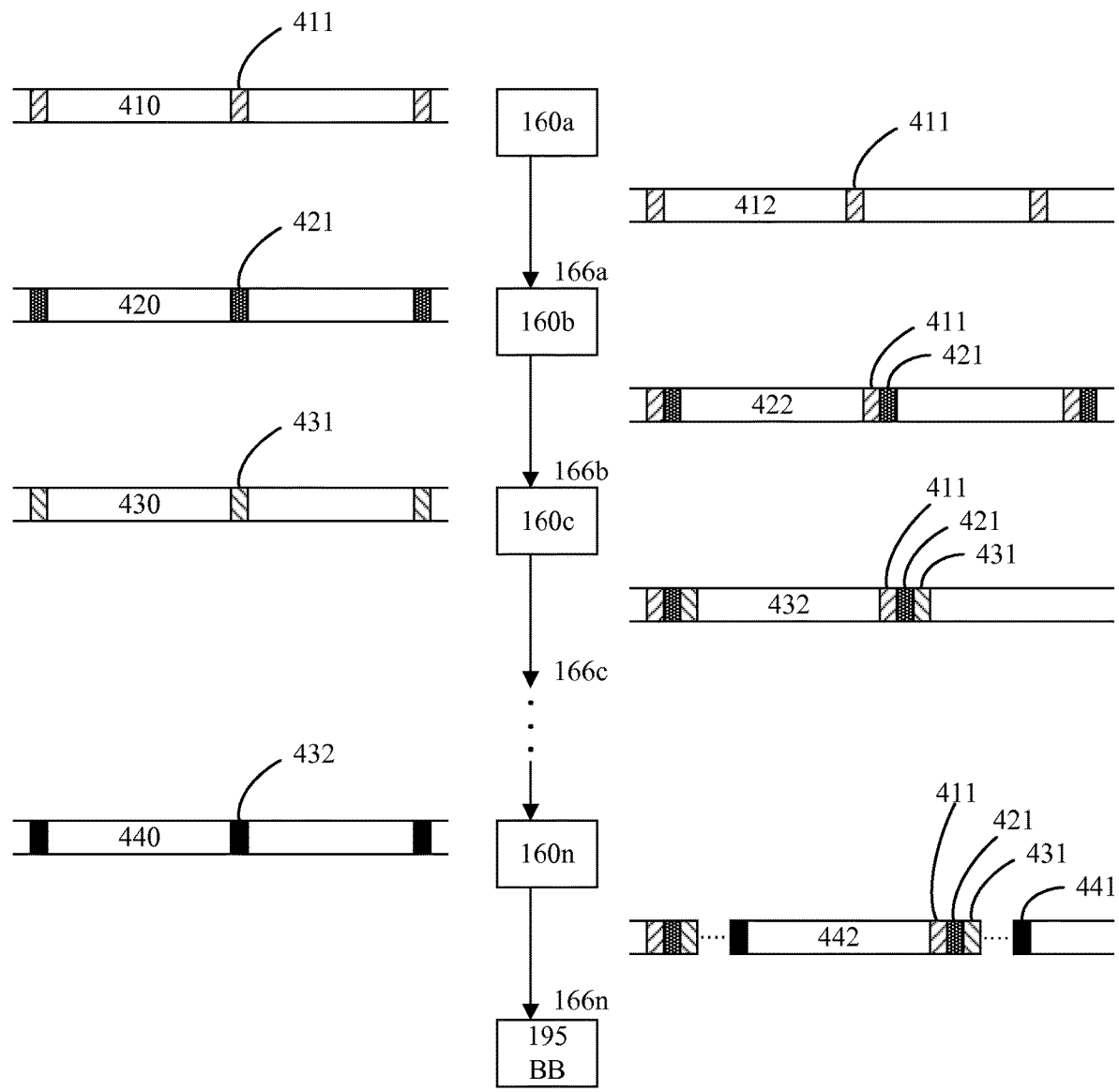
FIGS. 4A and 4B are schematic drawings illustrating example received signals and corresponding example output signals according to some embodiments.
Figure 4B:
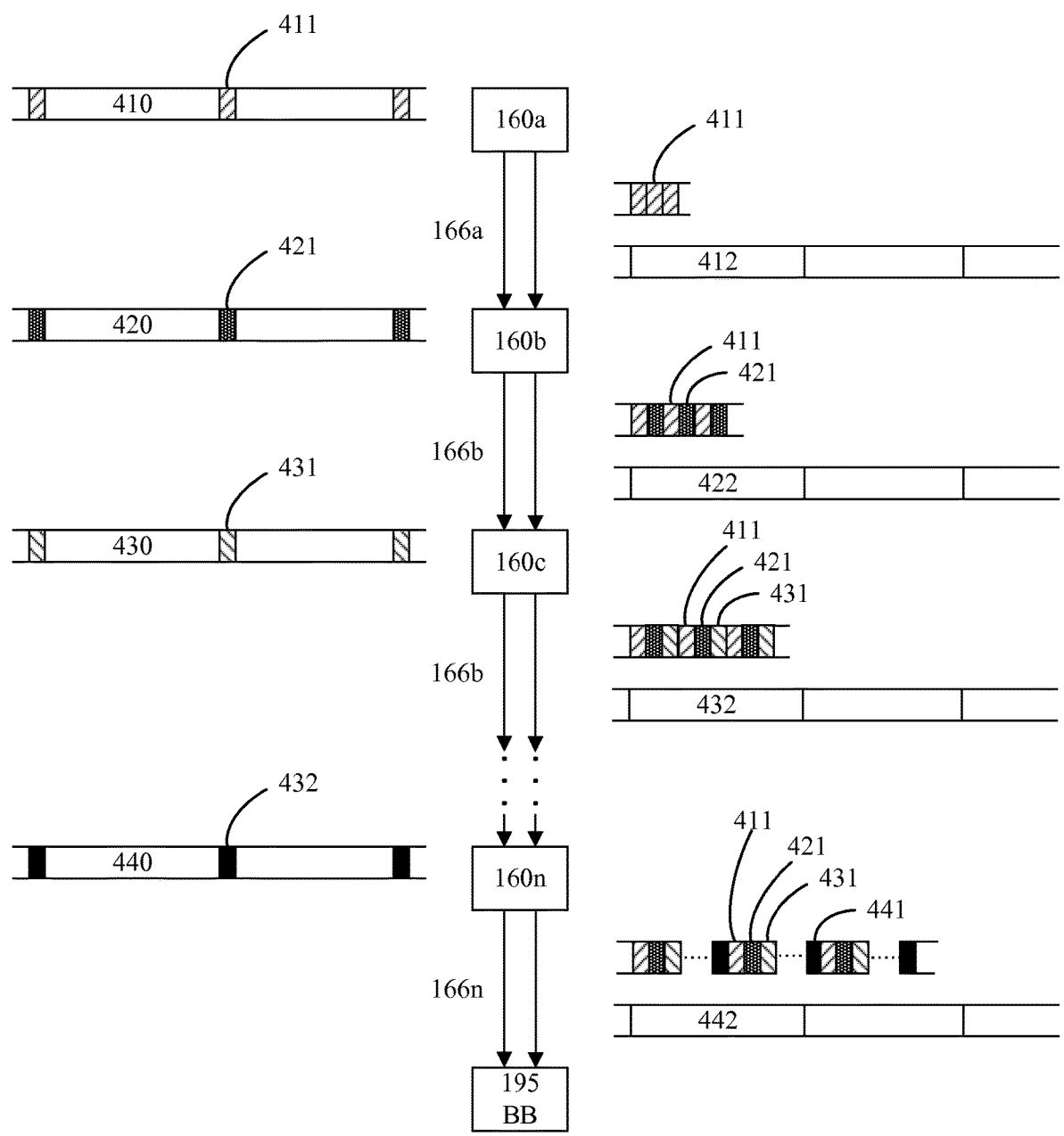

FIGS. 4A and 4B schematically illustrate example received signals and corresponding example output signals, for serial in/output and parallel in/output, respectively. A plurality of transceiver elements 160a, 160b, 160c, . . . , 160n (e.g., transceiver elements 200 in FIG. 4A and transceiver elements 300 in FIG. 4B) and a baseband unit (BB) 195 are connected in series to form a transceiver arrangement for beamforming reception (compare with FIG. 1B).

To the left in FIGS. 4A and 4B, the received radio frequency signal is illustrated for each of the transceiver elements (compare with 295, 395), comprising respective first received signal parts 410, 420, 430, 440 (compare with 293, 393) and respective second received signal parts 411, 421, 431, 441 (compare with 294, 394).

To the right in FIGS. 4A and 4B, the output signal 166a, 166b, 166c, . . . , 166n is illustrated for each of the transceiver elements (compare with 285, 385).

Each of the output signals comprises respective first output signal parts 412, 422, 432, 442 (compare with 283, 383). In these examples, it is assumed that both the first and second down-converted signal part are extracted, so each first output signal part is a combination of the first input signal parts received so far in the receiver chain (each possibly scaled and/or phase shifted by respective values). Hence, if the first received signal parts 410, 420, 430, 440 are denoted, respectively, by $y_1$, $y_2$, $y_3$, and $y_n$ when down-converted, the first output signal parts 412, 422, 432, 442 may be expressed, respectively, as $w_1 y_1$, $w_1 y_1 + w_2 y_2$, $w_1 y_1 + w_2 y_2 + w_3 y_3$, and $w_1 y_1 + w_2 y_2 + w_3 y_3 + \ldots + w_n y_n$, where $w_k$ is the multiplication factor (scaling and/or phase shift) applied for transceiver k. If the first down-converted signal is not extracted (e.g., for simplicity of implementation), $y_k$ would be replaced by $y_k + z_k$ in the above expressions, where $z_k$ denotes the second received signal part received at transceiver k when down-converted.

Each of the output signals also comprises respective second output signal parts (compare with 284, 384). Each second output signal part is a concatenation of the second input signal parts 411, 412, 413, 414 received so far in the receiver chain. Hence, if the second received signal parts 411, 421, 431, 441 are denoted, respectively, by $z_1$, $z_2$, $z_3$, and $z_n$ when down-converted, the second output signal parts may be expressed, respectively, as $[z_1]$, $[z_1, z_2]$, $[z_1, z_2, z_3]$, and $[z_1, z_2, z_3, \ldots z_n]$.

Figure 5:
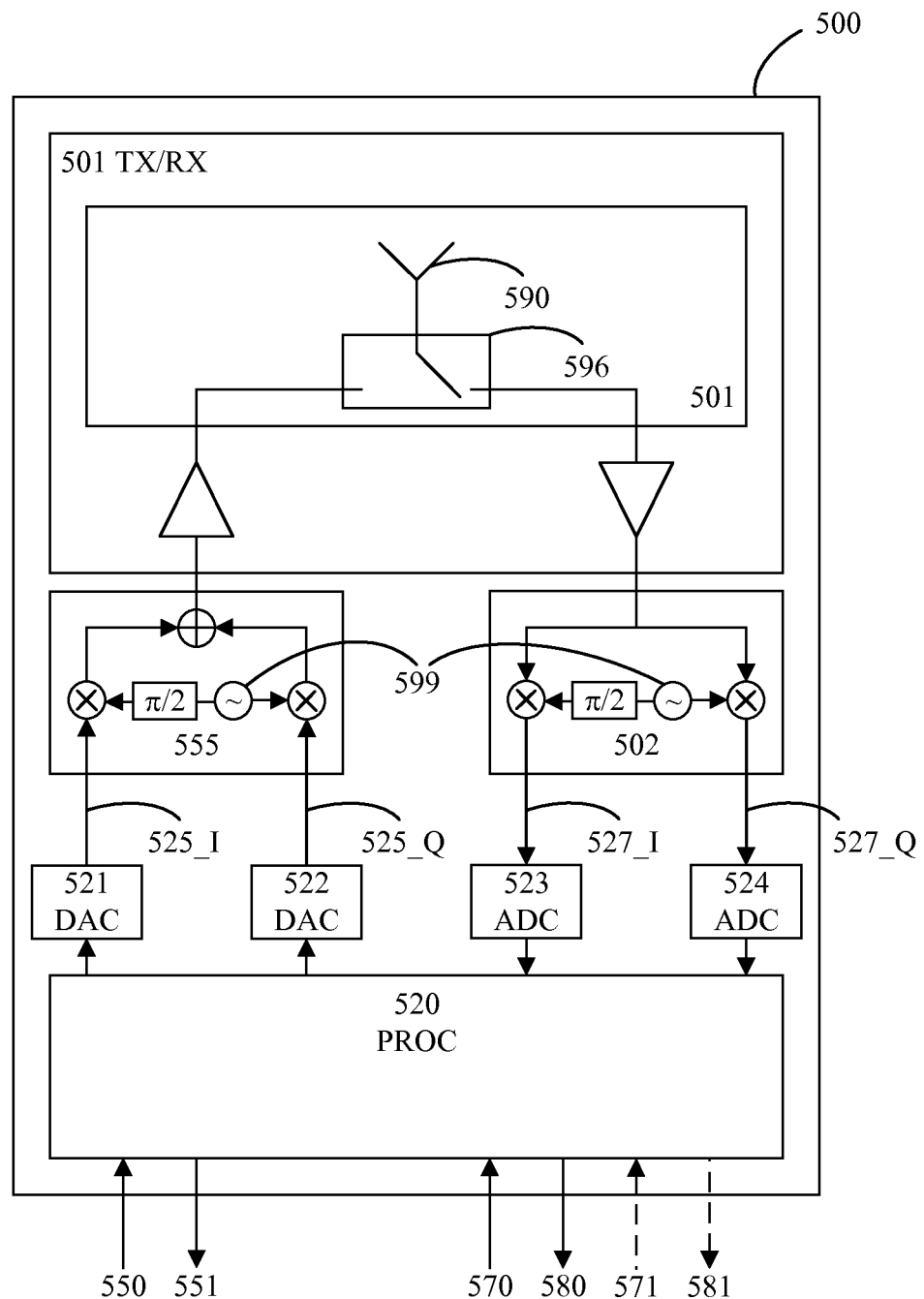
FIG. 5 is a schematic block diagram illustrating an example transceiver element according to some embodiments.

FIG. 5 schematically illustrates an example implementation of a transceiver element 500. For example, the transceiver element may correspond to any of the transceiver elements as described in connection with FIGS. 1B, 2A and 3A. The transceiver element 500 is suitable for digital beamforming applications, and may, for example be employed in multiple-input, multiple-output (MIMO) applications, or massive-MIMO applications.

The transceiver element comprises transceiver circuitry 501 (compare with 201, 301). The receiver circuitry is configured to receive a radio frequency signal via an antenna element 590 (compare with 290, 390) comprised in the transceiver circuitry 501. The antenna element may, for example, comprise a single antenna element or dual antenna element for polarized transmission and/or reception. In typical embodiments, the transceiver element 501 comprises only a single antenna element for each of a maximum of two polarizations. The antenna element may be arranged for transmission and/or reception by means of a signal duplexer. This function is schematically illustrated as a switch 696, without intention to limit the duplexing function to this implementation.

The radio frequency signal comprises a first received signal part and a second received signal part, wherein the first received signal part comprises data and/or control symbols, and the second received signal part comprises reference symbols for beamforming control.

The transceiver element 500 also comprises down-converting circuitry 502 (compare with 202, 302) configured to down-convert the radio frequency signal using a reference frequency 599 to provide a down-converted signal. In this implementation, the down-converted signal has an in-phase component 527_I and a quadrature component 527_Q, which are converted to the digital domain in respective analog-to-digital converters (ADC) 523, 524 and provided to processing circuitry (PROC) 520.

Of course, the down-converted (digital) signal comprises a first down-converted signal part corresponding to the first received signal part and a second down-converted signal part corresponding to the second received signal part.

In a serial approach, the transceiver element also comprises input circuitry configured to receive an input signal 570 (compare with 270) from a further transceiver element, and output circuitry configured to provide an output signal 580 (compare with 280) to another transceiver element or (for example) a baseband processing unit. The input signal comprises a first input signal part and a second input signal part, and the output signal comprises a first output signal part and a second output signal part.

The processing circuitry 520 may comprise extracting circuitry, multiplying circuitry, combining circuitry, and concatenating circuitry as described in connection to FIGS. 2A and 3A, as well as buffers and other circuitry, for providing the output signal as described in connection to FIGS. 4A and 4B.

In a parallel approach, the transceiver element also comprises input circuitry configured to receive an input signal 570, 571 (compare with 370, 371) from a further transceiver element, and output circuitry configured to provide an output signal 580, 581 (compare with 380, 381) to another transceiver element or (for example) a baseband processing unit. The input signal comprises a first input signal part 570 and a second input signal part 571, and the output signal comprises a first output signal part 580 and a second output signal part 580.

The processing circuitry 520 may comprise de-multiplexing circuitry, extracting circuitry, multiplying circuitry, combining circuitry, concatenating circuitry, and multiplexing circuitry as described in connection to FIGS. 2A and 3A, for providing the output signal as described in connection to FIGS. 4A and 4B.

The transceiver element 500 may also comprise additional input circuitry configured to receive a transmit signal 550 (compare with 250, 350)—typically from another transceiver element or from a baseband chip—and additional output circuitry configured to provide the transmit signal 551 (compare with 251, 351) to a further transceiver element.

The transmit signal is also prepared for transmission by the antenna element 590. In this implementation, the transmit signal—converted to the analog domain in respective digital-to-analog converters (DAC) 521, 522—has an in-phase component 525_I and a quadrature component 525_Q, which are provided to up-converting circuitry 555

(compare with 255, 355) configured to up-convert the transmit signal to radio frequency for transmission using a reference frequency 599.

WO 2017/044038 A1 discloses some example contexts and implementation details of a processing sub-systems, that may be applied also to the transceiver element 500.

Figure 6:
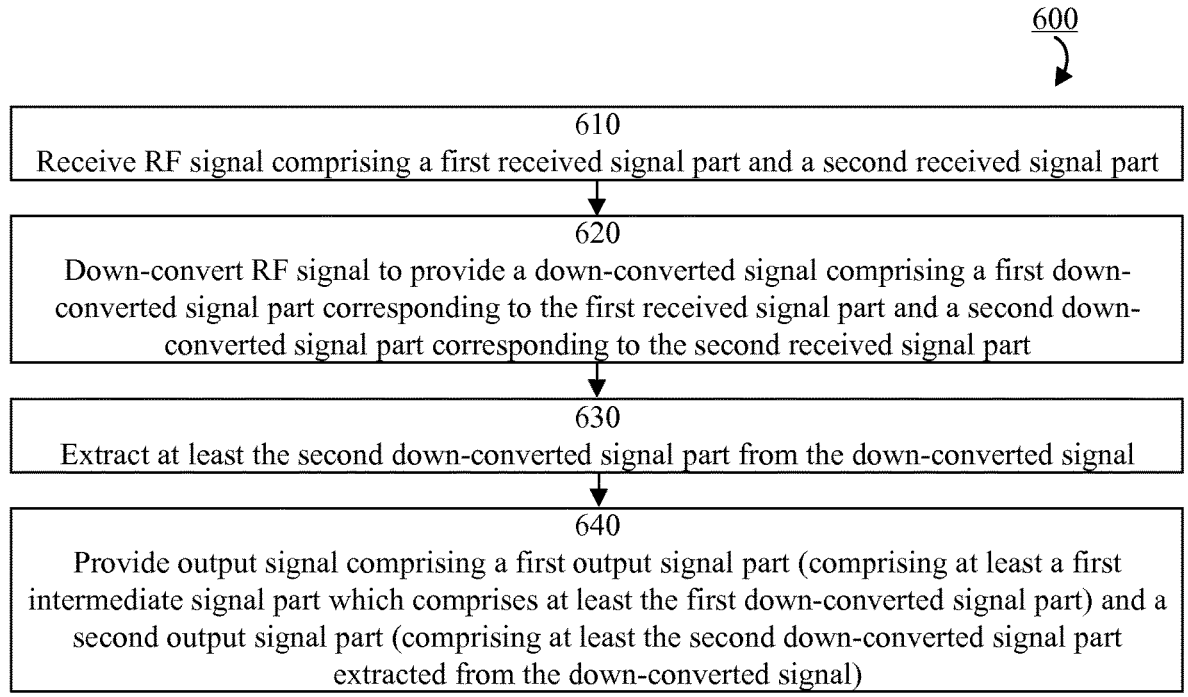
FIG. 6 is a flowchart illustrating example method steps according to some embodiments.

FIG. 6 illustrates an example method 600 according to some embodiments. The method comprises receiving a radio frequency signal via an antenna element associated with the receiving circuitry as illustrated by step 610, wherein the radio frequency signal comprises a first received signal part and a second received signal part. The second received signal part typically comprises reference symbols for beamforming control, and the first received signal part typically comprises data and/or control information.

The method also comprises down-converting the radio frequency signal to provide a down-converted signal as illustrated by step 620, wherein the down-converted signal comprises a first down-converted signal part corresponding to the first received signal part and a second down-converted signal part corresponding to the second received signal part.

The method also comprises extracting at least the second down-converted signal part from the down-converted signal as illustrated by step 630. In some embodiments, the method also comprises extracting the first down-converted signal part from the down-converted signal.

The method also comprises providing an output signal comprising a first output signal part and a second output signal part as illustrated by step 640, wherein the first output signal part comprises at least a first intermediate signal part which comprises at least the first down-converted signal part, and wherein the second output signal part comprises at least the second down-converted signal part extracted from the down-converted signal.

The first intermediate signal part may be the first down-converted signal part extracted from the down-converted signal, or may be down-converted signal as explained above.

The method may also comprise receiving (before step 640) an input signal from a further transceiver element, wherein the input signal comprises a first input signal part and a second input signal part. The second input signal part typically comprises reference symbols for beamforming control, and the first input signal part typically comprises data and/or control information, and also—when there is no extraction of the second down-converted signal part—reference symbols for beamforming control.

The method may comprise combining (before step 640 and after any of steps 620 and 630) the first input signal part and the first intermediate signal part to provide the first output signal part.

The method may also comprise concatenating (before step 640 and after step 630) the second input signal part and the (extracted) second down-converted signal part to provide the second output signal part.

The method may also comprise scaling and/or phase shifting the intermediate signal part before combining and/or before step 640.

The method may also comprise de-multiplexing and multiplexing as explained above for the parallel approach.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 7:
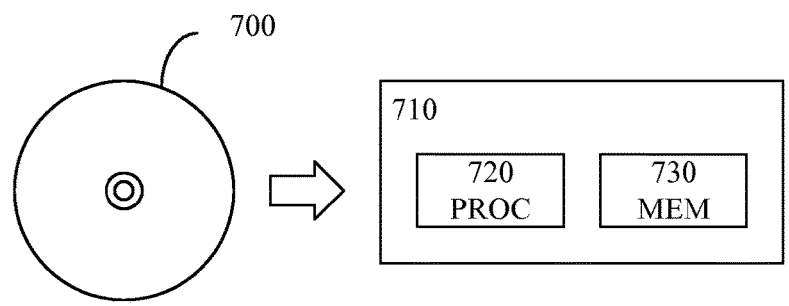
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a wireless communication device or a network node 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, the method illustrated in FIG. 7 and/or methods otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable.

Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A transceiver element comprising:
receiving circuitry configured to receive a radio frequency signal via an antenna element associated with the receiving circuitry, wherein the radio frequency signal comprises a first received signal part and a second received signal part;
down-converting circuitry configured to down-convert the radio frequency signal to provide a down-converted signal, wherein the down-converted signal comprises a first down-converted signal part corresponding to the first received signal part and a second down-converted signal part corresponding to the second received signal part;
extracting circuitry configured to extract at least the second down-converted signal part from the down-converted signal;
output circuitry configured to provide an output signal comprising a first output signal part and a second output signal part, wherein the first output signal part comprises at least a first intermediate signal part which comprises at least the first down-converted signal part, and wherein the second output signal part comprises at least the second down-converted signal part extracted from the down-converted signal;
input circuitry configured to receive an input signal from a further transceiver element, wherein the input signal comprises a first input signal part and a second input signal part;
combining circuitry configured to combine the first input signal part and the first intermediate signal part to provide the first output signal part; and
concatenating circuitry configured to concatenate the second input signal part and the second down-converted signal part to provide the second output signal part.

2. The transceiver element of claim 1, wherein the extracting circuitry is further configured to extract the first down-converted signal part from the down-converted signal to provide the first intermediate signal part.

3. The transceiver element of claim 1, wherein the extracting circuitry is configured to extract only the second down-converted signal part from the down-converted signal, and wherein the first intermediate signal part is the down-converted signal.

4. The transceiver element of claim 1, wherein the output circuitry comprises first and second output ports, wherein the first output port is configured to output a first output signal comprising the first output signal part and the second output port is configured to output a second output signal comprising the second output signal part.

5. The transceiver element of claim 1, wherein the output circuitry comprises one input port configured to output a single output signal comprising the first and second output signal parts, and wherein the transceiver element further comprises multiplexing circuitry configured to multiplex the first output signal part and the second output signal part to provide the single output signal.

6. The transceiver element of claim 1, further comprising first multiplying circuitry configured to scale and/or phase shift the first intermediate signal part.

7. The transceiver element of claim 1, wherein the first received signal part comprises data and/or control symbols, and wherein the second received signal part comprises reference symbols for beamforming control.

8. The transceiver element of claim 1, wherein the input circuitry comprises first and second input ports, wherein the first input port is configured to receive a first input signal comprising the first input signal part and the second input port is configured to receive a second input signal comprising the second input signal part.

9. The transceiver element of claim 1, wherein the input circuitry comprises one input port configured to receive a single input signal comprising the first and second input signal parts, and wherein the transceiver element further comprises de-multiplexing circuitry configured to separate the first and second input signal parts of the single input signal.

10. The transceiver element of claim 1, wherein the first input signal part comprises data and/or control information, and wherein the second input signal part comprises reference symbols for beamforming control.

11. The transceiver element of claim 1, further comprising:
additional input circuitry configured to receive a transmit signal;
up-converting circuitry configured to up-convert the transmit signal to a radio frequency transmit signal;
transmitting circuitry configured to transmit the radio frequency transmit signal via an antenna element associated with the transmitting circuitry; and
additional output circuitry configured to provide the transmit signal to the further transceiver element.

12. The transceiver element of claim 11, further comprising second multiplying circuitry configured to scale and/or phase shift the transmit signal.

13. A transceiver comprising:
two or more transceiver elements, each transceiver element comprising:
receiving circuitry configured to receive a radio frequency signal via an antenna element associated with the receiving circuitry, wherein the radio frequency signal comprises a first received signal part and a second received signal part;
down-converting circuitry configured to down-convert the radio frequency signal to provide a down-converted signal, wherein the down-converted signal comprises a first down-converted signal part corresponding to the first received signal part and a second down-converted signal part corresponding to the second received signal part;
extracting circuitry configured to extract at least the second down-converted signal part from the down-converted signal; and
output circuitry configured to provide an output signal comprising a first output signal part and a second output signal part, wherein the first output signal part comprises at least a first intermediate signal part which comprises at least the first down-converted signal part, and wherein the second output signal part comprises at least the second down-converted signal part extracted from the down-converted signal; and
a further signal processing element, connected in series wherein the output circuitry of each of the transceiver elements is connected to input circuitry of either of another one of the transceiver elements and the further signal processing element.

14. A wireless communication apparatus comprising the transceiver of claim 13.

\* \* \* \* \*